United States Patent [19]
Suzuki et al.

[11] Patent Number: 6,101,112
[45] Date of Patent: Aug. 8, 2000

[54] IC OUTPUT CIRCUIT BASED ON A PULSE WIDTH MODULATING SYSTEM

[75] Inventors: Toshiya Suzuki; Hiroyuki Tamagawa; Kaori Ikuta, all of Tokyo, Japan

[73] Assignee: Mitsubishi Denki Kabushiki Kaisha, Tokyo, Japan

[21] Appl. No.: 09/305,205

[22] Filed: May 5, 1999

[30] Foreign Application Priority Data

Jan. 25, 1999 [JP] Japan .................................. 11-015879

[51] Int. Cl.$^7$ .................................................. H02M 7/44
[52] U.S. Cl. .......................................................... 363/98
[58] Field of Search .................. 363/16, 17, 97, 363/98, 131, 132

[56] References Cited

U.S. PATENT DOCUMENTS 5,753,964   5/1998   Yashita et al. ............................ 257/547
5,874,817   2/1999   Yashita et al. ............................ 318/439
5,877,602   3/1999   Knodoh et al. ........................... 318/254
5,877,950   3/1999   Bonsignour et al. ..................... 363/98
5,952,856   9/1999   Horiguchi et al. ........................ 363/98

FOREIGN PATENT DOCUMENTS 63-171170   7/1998   Japan .

Primary Examiner—Matthew Nguyen
Attorney, Agent, or Firm—Leydig, Voit & Mayer, Ltd.

[57] ABSTRACT

A current path for a discharge current leading from ground to a motor is provided when a pulse width modulation (PWM) control is OFF, with a parasitic diode between a P type substrate of an NPN transistor and an N type collector region. A diode with a cathode and an anode connected to a base and an emitter of an NPN transistor is also provided, so that when the PWM control is OFF, a base current is conducted by the diode to the NPN transistor, whereby a current flows from the emitter of the NPN transistor to the collector, providing a current path for the discharge current from the motor to a power terminal.

3 Claims, 6 Drawing Sheets

IC OUTPUT CIRCUIT BASED ON A PULSE WIDTH MODULATING SYSTEM

FIELD OF THE INVENTION

The present invention relates to an IC output circuit based on a pulse width modulating system.

BACKGROUND OF THE INVENTION

There has been known the technology in which a circuit for supplying power to the motor of an OA equipment or a FA equipment is formed as an integrated circuit (IC) (See for example Japanese Patent Laid-Open Publication No. SHO 63-171170). There are strong needs in recent years for downsizing the IC output circuit as well as to realize a high rotational speed for the motor. To achieve this goal, the IC is required to withstand high voltage and large current. To enable use of a large current in an IC, it is effective to use a pulse width modulating system (described as PWM hereinafter) for a control system for an output transistor. The power supplied to the IC can be reduced with the PWM system.

To provide controls for driving a multi-phase motor using the PWM system (described as PWM control) with an IC output circuit based on a bipolar transistor system, a current path including a diode is provided in order to discharge the energy stored in the coil of the motor. A current path returning from the motor to a power supply unit is provided by connecting an anode of the diode to an output terminal of the IC output circuit and connecting a cathode to the power supply. A current path from the ground (GND) is provided by connecting the anode of the diode to the ground GND and connecting the cathode to the output terminal of the IC output circuit. Each of the diodes requires the same capability for allowing flow of current therethrough as that of the output transistor, so that they require a junction area of the same order to that of the output transistor.

FIG. 5 is a circuit diagram showing configuration of a conventional type of IC output circuit based on the pulse width modulating system, and FIG. 6 is a timing chart showing timing of operations of the IC output circuit. This IC output circuit has, for instance, a triangular wave generating circuit 102, a comparator 103, a position detecting circuit 104, an output element control circuit 105, a capacitor C1, six NPN transistors 111, 112, 113, 114, 115 and 116 and six diodes 123, 124, 125, 126, 127 and 128.

The IC output circuit is connected to three output terminals OUT1, OUT2, and OUT3 of a three-phase spindle motor M, a speed control circuit 101 connected to the outside, three Hall elements H1, H2 and H3, and two resistors R1, R2. In FIG. 5, a region enclosed with a dot and dash line indicates an IC chip, and the white dots indicate terminals.

Each NPN transistor 111, 112, 113, 114, 115 and 116 is a switching element for output, and the base of each of them is connected via signal lines B1, B2, B3, B4, B5 and B6 respectively to the output element control circuit 105. The collector of the first NPN transistor 111 is connected to a power terminal VCC as well as to the cathode of the first diode 123 and the emitter is connected to the first output terminal OUT1 as well as to the anode of the first diode 123.

The collector of the second NPN transistor 112 is connected to the power terminal VCC as well as to the cathode of the second diode 124 and the emitter is connected to the second output terminal OUT2 as well as to the anode of the second diode 124.

The collector of the third NPN transistor 113 is connected to the power terminal VCC as well as to the cathode of the third diode 125 and the emitter is connected to the output terminal OUT3 as well as to the anode of the third diode 125.

The collector of the fourth NPN transistor 114 is connected to the emitter of the first NPN transistor 111 as well as to the cathode of the fourth diode 126, and the emitter of the fourth NPN transistor 114 is connected to the ground GND as well as to the anode of the fourth diode 126.

The collector of the fifth NPN transistor 115 is connected to the emitter of the second NPN transistor 112 as well as to the cathode of the fifth diode 127, and the emitter of the fifth NPN transistor 115 is connected to the ground GND as well as to the anode of the fifth diode 127.

The collector of the sixth NPN transistor 116 is connected to the emitter of the third NPN transistor 113 as well as to the cathode of the sixth diode 128, and the emitter of the sixth NPN transistor 116 is connected to the ground GND as well as to the anode of the sixth diode 128.

The speed control circuit 101 generates a control reference voltage signal S10. The triangular wave generating circuit 102 charges or discharges the capacitor C1 with a constant current, and thereby a triangular wave signal S11 is generated in the upper side of the capacitor. When the control reference voltage signal S10 is inputted via the reference voltage terminal VCTL into the comparator 103, the comparator 103 compares the control reference voltage signal S10 to that of the triangular wave signal S11.

When the potential of the control reference voltage signal S10 is higher than that of the triangular wave signal S11, the potential of an output signal S12 from the comparator is set in a relatively high "H" level. While the signal S12 is at the "H" level, PWM control is ON (Refer to the period "A" in FIG. 6). When the potential of the control reference voltage signal S10 is lower than that of the triangular wave signal S11, the potential of the output signal S12 from the comparator 103 is set in a relatively low "L" level, while PWM control is kept OFF (Refer to the period "B" in FIG. 6).

The Hall elements H1, H2 and H3 output signals S1, S2, S3, S4, S5 and S6 each indicating a position of the motor M. The position detecting circuit 104 outputs output control signals S7, S8 and S9 for deciding a phase of a current flow in the motor M according to the position signals S1, S2, S3, S4, S5 and S6. The resistors R1 and R2 limit the currents flowing through the Hall elements H1, H2 and H3.

The output element control circuit 105 supplies a current into any of the signal lines B1, B2 and B3 to turn ON any of the upper-side NPN transistors 111, 112 and 113 according to the control signals S7, S8 and S9 outputted from the position detecting circuit 104 when the output signal S12 from the comparator 103 is at the "H" level.

However, the first NPN transistor 111 and the fourth NPN transistor 114 are never turned ON simultaneously. Similarly the second NPN transistor 112 and the fifth NPN transistor 115 are never turned ON simultaneously, and further the third NPN transistor 113 and the sixth NPN transistor 116 are not turned ON simultaneously.

In other words, NPN transistors in the same phase are not turned ON simultaneously. On the other hand, the output element control circuit 105 does not supply a current to any of the six signal lines B1, B2, B3, B4, B5 and B6 while the output signal S12 from the comparator 103 is at the "L" level. Therefore, a diode is turned ON that has the same phase as the phase of the transistor which is ON when the signal S12 is at "H" level and whose upper side (the side towards VCC) and lower side (the side towards GND) are connected oppositely as explained in the next paragraph.

For instance, when the first NPN transistor 111 (having upper side connected to VCC) is ON, the fourth diode 126 (having the same phase and having the upper side connected to the GND) is turned ON, and when the second NPN transistor 112 or the third NPN transistor 113 (having upper side connected to VCC) is ON, the fifth diode 127 or the sixth diode 128 (having the same phase and having the upper side connected to the GND) is respectively turned ON. Similarly, when the fourth NPN transistor 114, fifth NPN transistor 115 or the sixth NPN transistor 116 is ON, the first diode 123, second diode 124 or the third diode 125 is respectively turned ON.

Next, operations of the IC output circuit shown in FIG. 5 are described. To describe a case when PWM control is ON, namely when, for instance, the first NPN transistor 111 and the fifth NPN transistor 115 are turned ON, output current flows from the power terminal VCC via the first NPN transistor 111 to the first output terminal OUT1 to the motor M to the second output terminal OUT2 to the fifth NPN transistor 115 and finally to the ground GND.

When the PWM control is switched OFF, both the first NPN transistor 111 and the fifth NPN transistor 115 are turned OFF, while the fourth diode 126 and the second diode 124 are turned ON due to discharge of energy stored in the motor M. Therefore, a current flows from the ground GND via the fourth diode 126 to the first output terminal OUT1 to the motor M to the second output terminal OUT2 to the second diode 124 and finally to the power terminal VCC.

When the PWM control is again switched ON, a current flows from any of the first to third NPN transistors 111, 112 and 113 to any of the fourth to sixth NPN transistors 114, 115 and 116.

As described above, when PWM control is OFF, the discharged current flows through any of the two diodes of the six diodes 123, 124, 125, 126, 127 and 128. This current is the energy stored in the coil of the motor M and its current quantity is substantially same as that of an output current from the motor M.

Thus, each of the diodes 123, 124, 125, 126, 127 and 128 requires a capability of allowing a current to flow. Therefore, when the IC output circuit shown in FIG. 5 is formed in an IC by means of bipolar transistor processing, as shown in the pattern layout circuit of FIG. 7, the percentage of the area occupied by the diodes 123, 124, 125, 126, 127 and 128 becomes very large.

In FIG. 7, regions 102, 103, 104 and 105 represent the places where the triangular generating circuit 102, comparator 103, position detecting circuit 104 and output element control circuit 105 are provided. Regions 111, 112, 113, 114, 115 and 116 represent the places where the NPN transistors 111, 112, 114, 114, 115 and 116 are provided. Finally, regions 123, 124, 125, 126, 127 and 128 represent the places where the diodes 123, 124, 125, 126, 127 and 128 are provided.

When a current path returned from the ground GND to the power terminal VCC is to be established, the current path is established in the upper side by turning OFF the fourth to sixth NPN transistors 114, 115 and 116, or in the lower side by turning OFF the first to third NPN transistors 111, 112 and 113.

As described above, when a conventional type of IC output circuit is made by means of bipolar transistor processing, the area occupied by the diodes which provide a current path for the discharged current becomes larger when PWM control is OFF, so that it is difficult to reduce the area of the pattern layout, which, in turn, makes it difficult to down-size the IC chip.

Further, when PWM control is OFF, potentials at the output terminals OUT1, OUT2 and OUT3 become lower than the ground potential GND, so that a parasitic transistor may be formed. To prevent this phenomenon, it is desirable to form the diodes 126, 127 and 128 with a Schottky diode having a low regular-directional voltage, but a Schottky diode is expensive, so that it is difficult to reduce the IC cost.

SUMMARY OF THE INVENTION

It is an object of the present invention to provide an IC output circuit based on a pulse width modulating system formed with a small-sized and low price IC chip by reducing an area occupied by the diodes which provide a current path for a discharged current when PWM control is OFF and preventing formation of a parasitic transistor in each of the diodes.

To achieve the object described above, an IC output circuit according to the present invention comprises an upper-side NPN transistor with collector connected to a power terminal and emitter connected to a first terminal, a lower-side NPN transistor with emitter connected to the ground and collector connected to a second terminal, a diode with anode and cathode connected to emitter and base of the upper-side NPN transistor, a current path leading from the ground to the second terminal, and a current path leading from the first terminal to the power terminal through which a base current is supplied by the diode to the upper-side transistor is formed by connecting emitter and collector of the upper-side NPN transistor to each other.

In this invention, configuration is allowable in which the diode is formed with an NPN transistor, and collector and base in this transistor are short-circuited to form an anode, and emitter of this transistor is used as a cathode.

In this invention, a configuration is allowable in which a region for forming the upper-side NPN transistor is located adjacent to a region for forming a signal system circuit in an IC output circuit, a region for forming the lower-side NPN transistor is located adjacent to the region for forming the upper-side NPN transistor, and a region for forming a diode is located adjacent to the area for forming the lower-side NPN transistor.

Other objects and features of this invention will become apparent from the following description with reference to the accompanying drawings.

DESCRIPTION OF THE PREFERRED EMBODIMENT

Detailed description is made for an embodiment of an IC output circuit based on a pulse width modulating system according to the present invention with reference to the related drawings.

Figure 1:
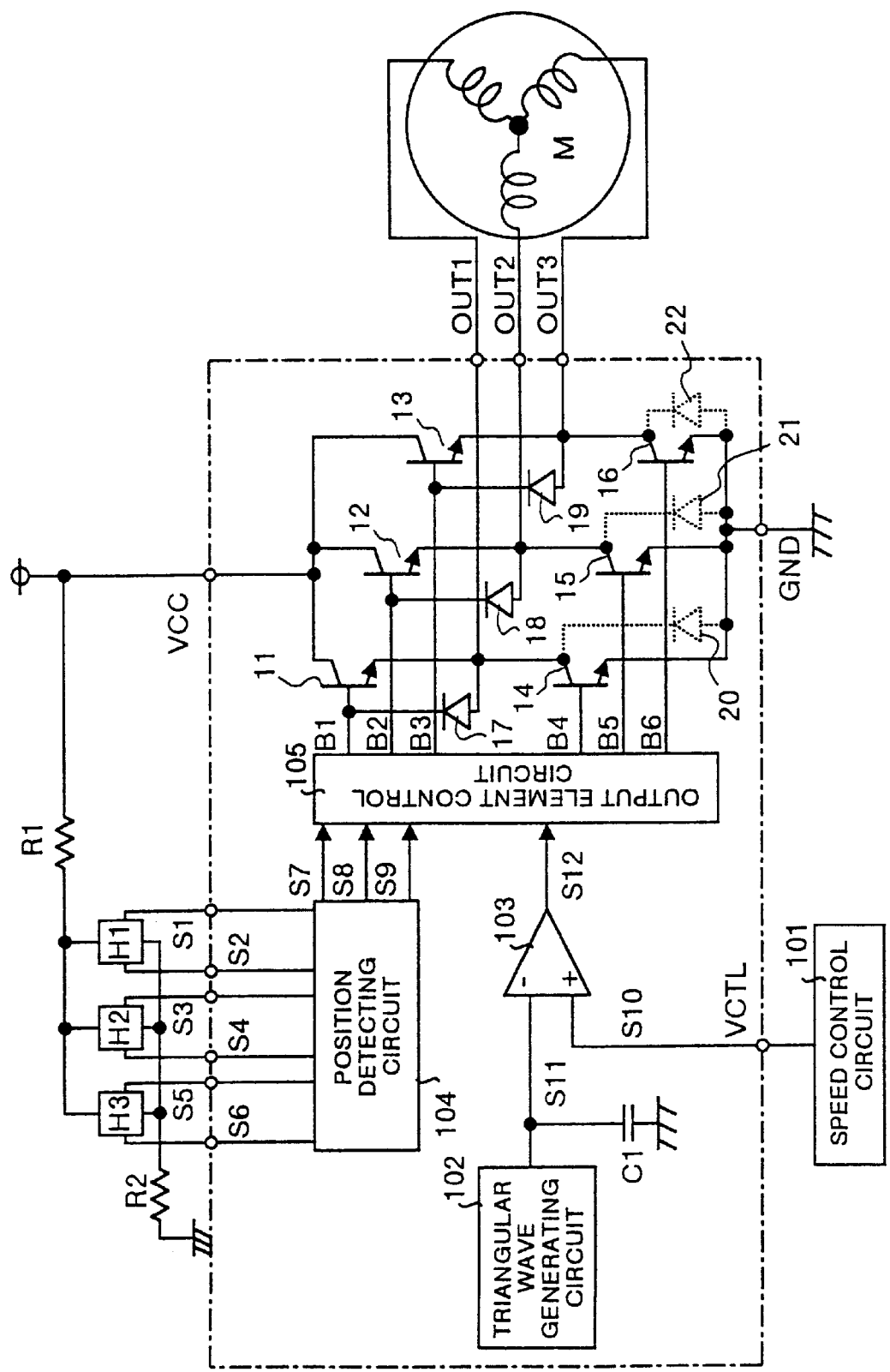
FIG. 1 is a circuit diagram showing one example of an IC output circuit based on a pulse width modulating system according to the resent invention.

FIG. 1 is a circuit diagram showing one example of the IC output circuit based on a pulse width modulating system according to the present invention. The IC circuit comprises, for instance, a triangular wave generating circuit 102, a comparator 103, a position detecting circuit 104, an output element control circuit 105, a capacitor C1, six NPN transistors 11, 12, 13, 14, 15 and 16 each functioning as a switching element for output, and three diodes 17, 18 and 19.

The IC output circuit is connected to three output terminals OUT1, OUT2, and OUT3 of a three-phase spindle motor M, a speed control circuit 101 connected to the outside, three Hall elements H1, H2 and H3, and two resistors R1, R2. It should be noted that, in FIG. 1, a region enclosed with a dot and dash line indicates an IC chip, and the white dots indicate terminals.

The base of the first NPN transistor 11 is connected via the cathode of the first diode 17 and a signal line B1 to the output element control circuit 105, the collector of it is connected to a power terminal VCC, and the emitter is connected to the first output terminal OUT1 as well as to the anode of the first diode 17.

The base of the second NPN transistor 12 is connected via the cathode of the second diode 18 and a signal line B2 to the output element control circuit 105, the collector of it is connected to the power terminal VCC, and the emitter of it is connected to the second output terminal OUT2 as well as to the anode of the second diode 18.

The base of the third NPN transistor 13 is connected via the cathode of the third diode 19 and a signal line B3 to the output element control circuit 105, the collector of it is connected to the power terminal VCC, and emitter of it is connected to the third output terminal OUT3 as well as to the anode of the third diode 19.

The collector and emitter of the fourth NPN transistor 14 are connected to the emitter of the first NPN transistor 11 and to the ground GND respectively. The fourth NPN transistor 14 has a collector region, which is an N type region in a P type substrate, and a parasitic diode 20 is generated as a fourth diode between the P type substrate and the N type collector.

The collector and emitter of the fifth NPN transistor 15 are connected to the emitter of the second NPN transistor 12 and to the ground GND, respectively. Between the N type collector of the fifth NPN transistor 15 and the P type substrate, a parasitic diode 21 is generated as a fifth diode, in the same manner as the fourth diode 20.

The collector and emitter of the sixth NPN transistor 16 are connected to the emitter of the third NPN transistor 13 and to the ground GND respectively. Between the N type collector of the sixth NPN transistor 16 and the P type substrate, a parasitic diode 22 is generated as a sixth diode in the same manner as the fourth diode 20.

The parasitic diodes 20, 21 and 22 are, different from the fourth to sixth NPN transistors 14, 15 and 16, not generated in the IC substrate and therefore are indicated with broken lines in FIG. 1.

Figure 5:
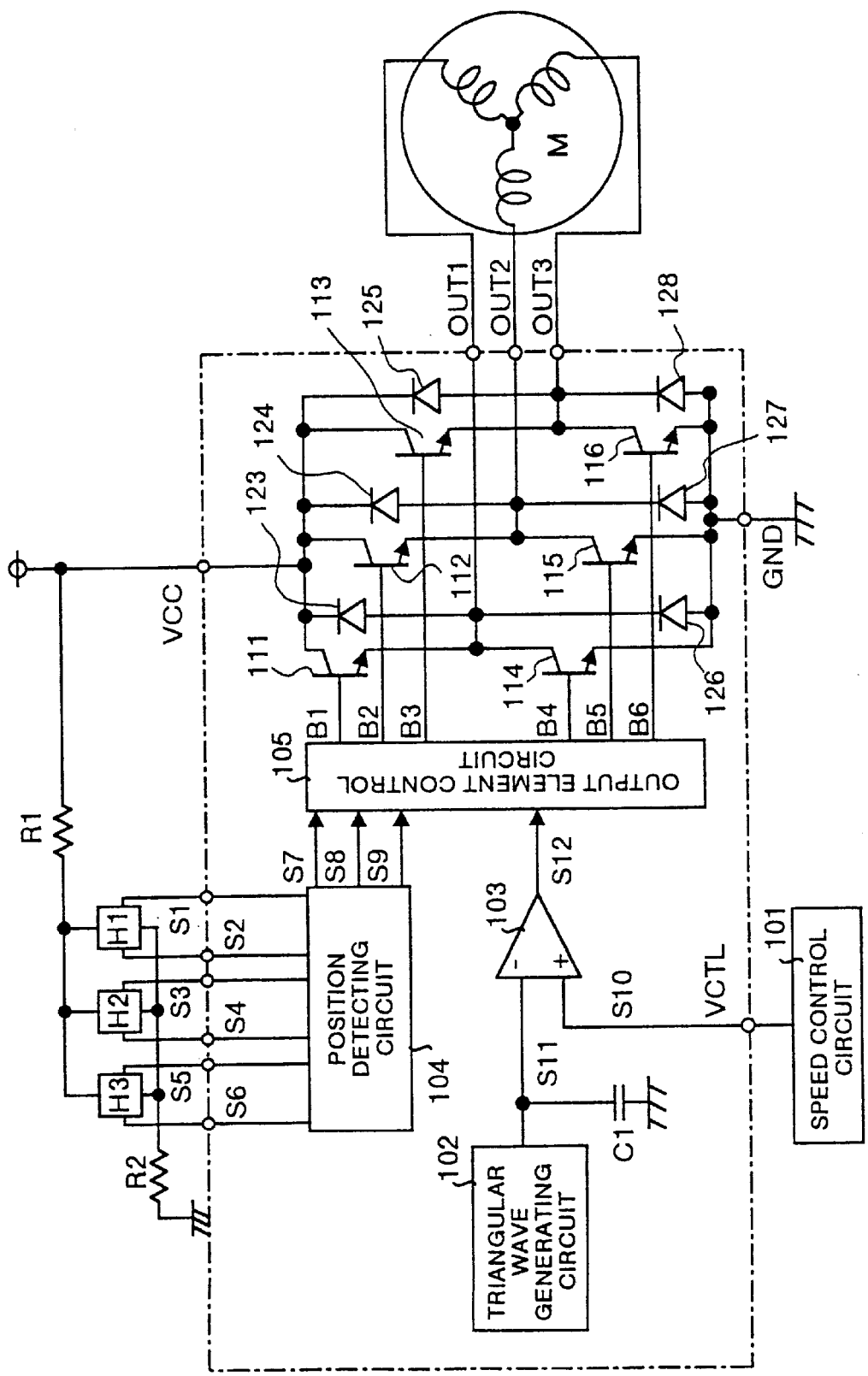
FIG. 5 is a circuit diagram showing configuration of a conventional IC output circuit based on a pulse width modulating system.
Figure 6:
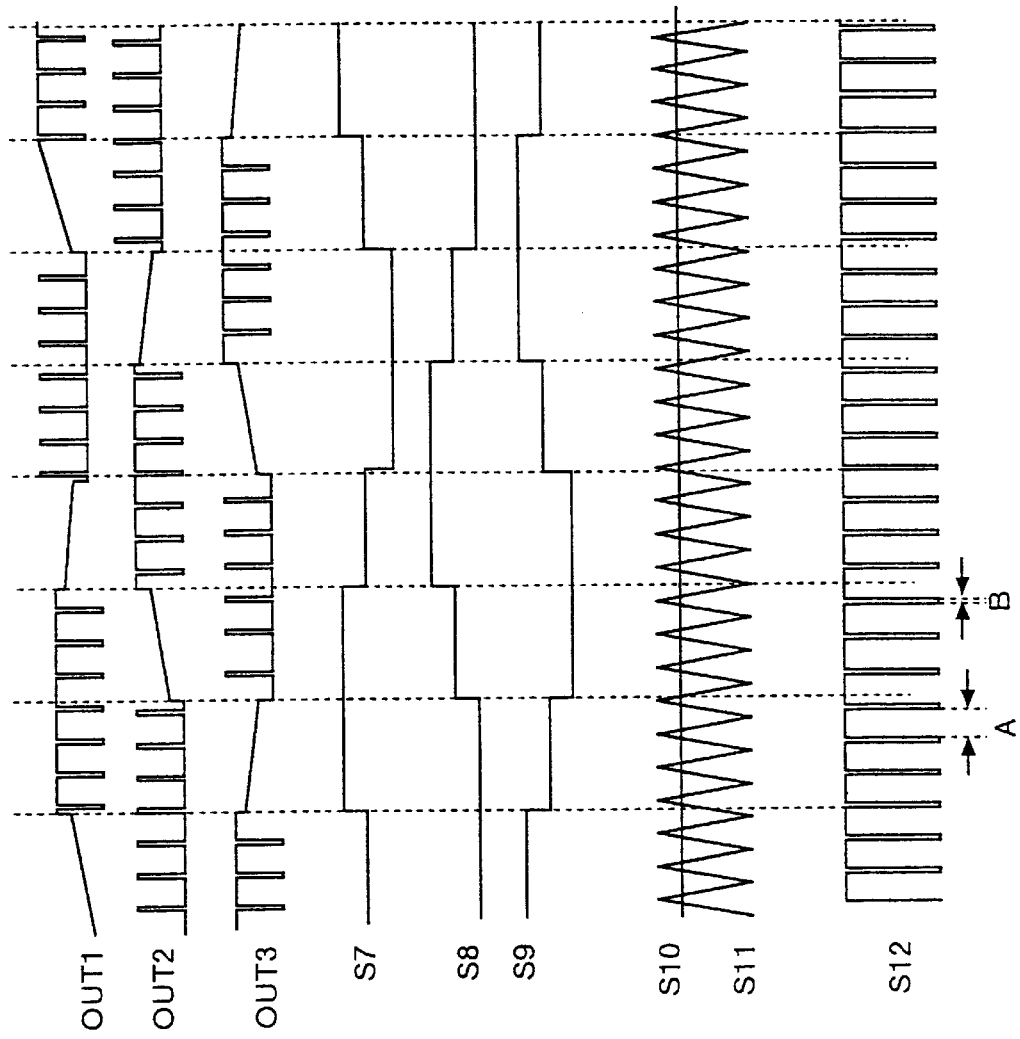
FIG. 6 is a timing chart showing timing of operations of the IC output circuit.
Figure 7:
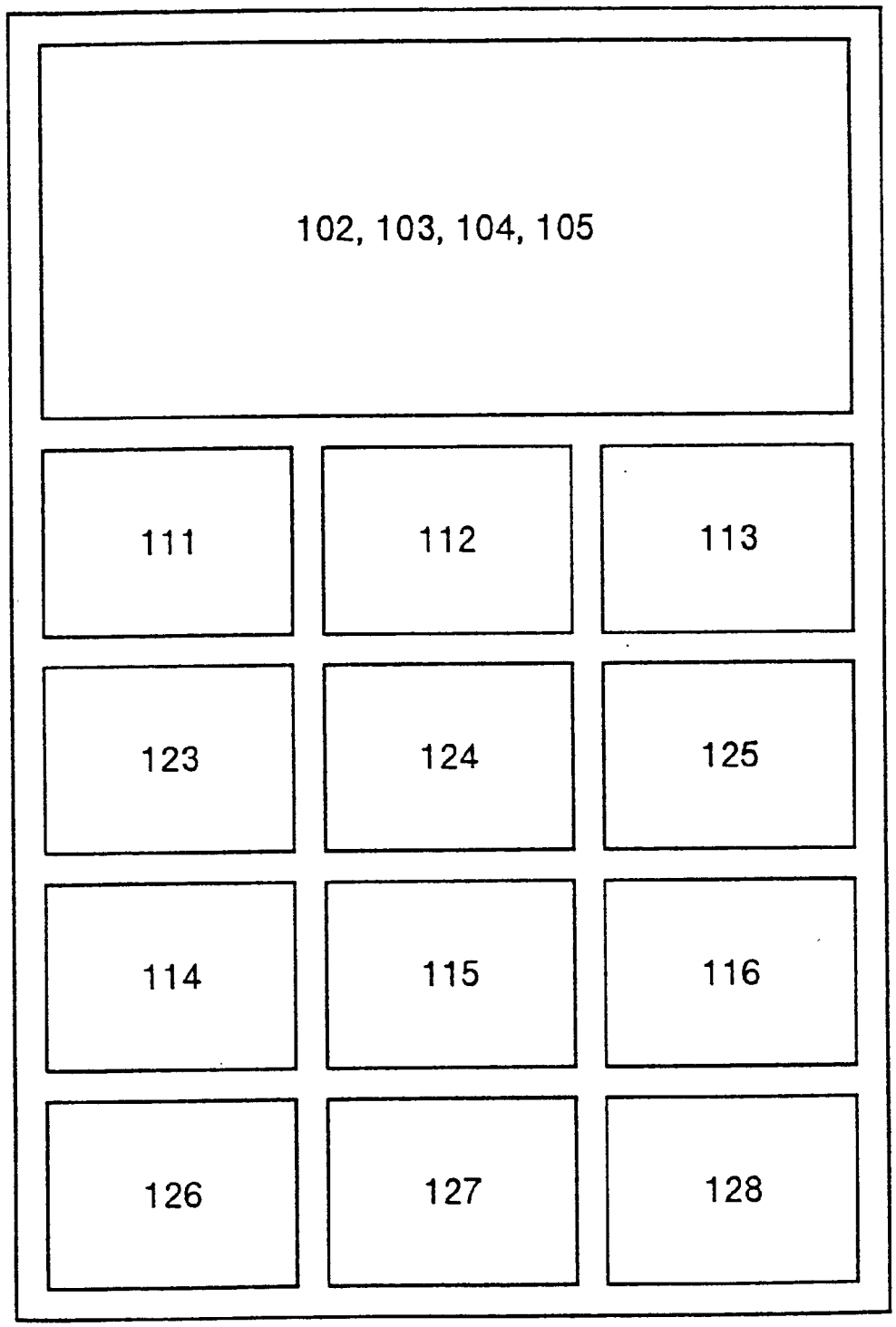
FIG. 7 is a pattern layout view of the IC output circuit formed by bipolar transistor processing.

The speed control circuit 101, triangular wave generating circuit 102, comparator 103, position detecting circuit 104, capacitor C1, Hall elements H1, H2 and H3, and resistors R1 and R2 have the same functions as those shown in FIG. 5, and description thereof is not repeated.

When the output signal S12 from the comparator 103 is at "H" level, namely when the potential of the control reference voltage signal S10 is higher than the potential of the triangular wave signal S11, the output element control circuit 105 supplies a current to any of the signal lines B1, B2 and B3 and also to any of the signal lines B4, B5 and B6 according to the control signals S7, S8 and S9 outputted from the position detecting circuit 104. Due to this, any one of the upper-side NPN transistors 11, 12 and 13 and any one of the lower-side NPN transistors 14, 15 and 16 is turned ON.

However, the first NPN transistor 11 and the fourth NPN transistor 14 are never turned ON simultaneously. Similarly, the second NPN transistor 12 and the fifth NPN transistor 15 are never turned ON simultaneously and further the third NPN transistor 13 and the sixth NPN transistor 16 are never turned ON simultaneously.

On the other hand, when the output signal S12 from the comparator 103 is at "L" level, namely when the potential of the control reference voltage signal S10 is lower than the potential of the triangular wave signal S11, the output element control circuit 105 does not supply a current to any of the six signal lines B1, B2, B3, B4, B5 and B6. Therefore, a diode is turned ON that has the same phase as the phase of the transistor which is ON when the signal S12 is at "H" level and whose upper side (the side towards VCC) and lower side (the side towards GND) are connected oppositely as explained above.

Namely, for instance, when the first NPN transistor 11 is ON, the fourth diode 20 is turned ON, and when the second NPN transistor 12 or the third NPN transistor 13 is ON, the fifth diode 21 or the sixth diode 22 are respectively turned ON. Similarly, when the fourth NPN transistor 14, the fifth NPN transistor 15 or the sixth NPN transistor 16 are turned ON, the first diode 17, the second diode 18 or the third diode 19 are respectively turned ON.

When the first diode 17 is turned ON, base current flows into the first NPN transistor 11, and hence, a current flows from the emitter to the collector in the first NPN transistor 11. Similarly, when the second diode 18 or the third diode 19 is turned ON, base current flows to the second NPN transistor 12 or third NPN transistor 13 respectively, and hence, a current flows from the emitter to the collector of the second NPN transistor 12 or the third NPN transistor 13.

Figure 2A:
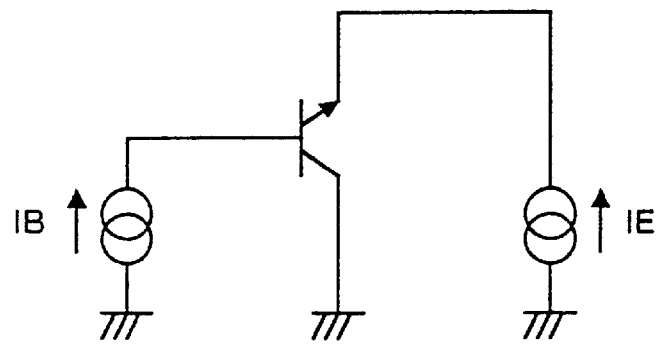
FIG. 2A is a circuit diagram of a circuit and FIG. 2B is a graph showing a current amplification rate for an emitter current when a transistor is used in the reverse direction as in FIG. 2A.
Figure 2B:
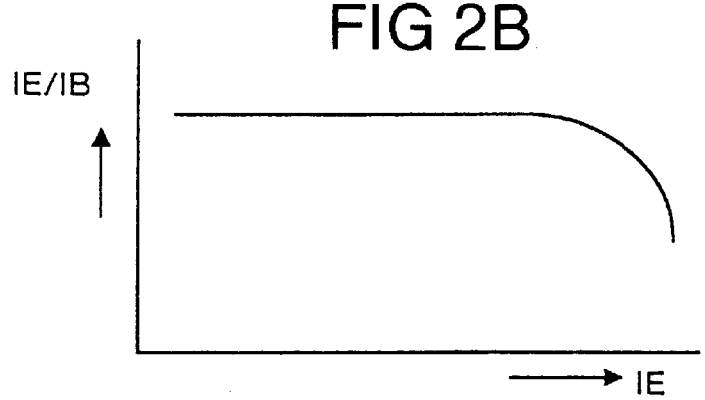

Namely, the first to third NPN transistors 11, 12 and 13 are used so that orientation of each transistor will be reverse (so that current flows from emitter to collector rather than from collector to emitter). FIG. 2A is a circuit diagram and FIG. 2B is a graph showing the characteristic of current amplification ratio IE/IB (IB:base current) for an emitter current IE when a transistor is used in the reverse direction. Since the current amplification ratio is higher, the first to third diodes 17, 18 and 19 which supply a base current to the first to third NPN transistors 11, 12 and 13 can be down-sized, which in turn makes it possible to reduce the area for pattern layout.

Description is made below for operation of the IC output circuit shown in FIG. 1. To describe a case when PWM control is ON, namely when, for instance, the first NPN transistor 11 and the fifth NPN transistor 15 are turned ON, output current flows from the power terminal VCC via the first NPN transistor 11 to the first output terminal OUT1 to the motor M to the second output terminal OUT2 to the fifth NPN transistor 15 and finally to the ground GND.

When PWM control is switched OFF from this state, both the first NPN transistor 11 and the fifth NPN transistor 15 are turned OFF, and then the fourth diode 20 and the second diode 18 are turned ON due to the energy discharged from the motor M. As the fourth diode 20 is a parasitic diode, a current path for a current flow from the IC substrate at the ground potential GND to the collector of the fourth NPN transistor 14 is formed.

Further, when the second diode 18 is turned ON, a current path for a current flow from the emitter to the collector of the second NPN transistor 12 is formed. Therefore, current flows from the ground GND via a collector of the fourth NPN transistor 14 to the first output terminal OUT1 to the motor M to the second output terminal OUT2 to the emitter of the second NPN transistor 12 to the collector of the second NPN transistor 12 and finally to the power terminal VCC.

Then, when PWM control is turned ON again, a current flows from any one of the first to third NPN transistors 11, 12 and 13 to any one of the fourth to sixth NPN transistors 14, 15 and 16.

By the way, the fourth to sixth diodes 20, 21 and 22 use the fourth to sixth NPN transistors 14, 15 and 16, all of which are output switching elements, and an IC substrate, so that the diodes have adequate capability for the flow of an electric current. However, when PWM control is OFF, potentials at the first to third output terminals OUT1, OUT2 and OUT3 are lower than the ground potential GND, so that adequate measures are required by way of chip layout or the like to prevent generation of a parasitic transistor (Refer to FIG. 4).

Figure 3:
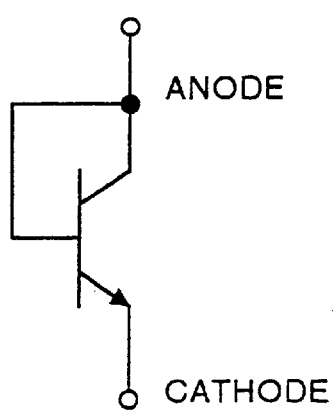
FIG. 3 is a circuit diagram showing example of first to third diodes in the IC output circuit according to the present invention.

FIG. 3 is a circuit diagram showing one example of the first to third diodes 17, 18 and 19. Each of these diodes 17, 18 and 19 has an anode formed by short-circuiting the collector and the base of an NPN transistor and uses the emitter of the transistor as a cathode. When PWM control is OFF, potential at the anode (a collector of the NPN transistor) of each of the diodes 17, 18 and 19 becomes lower than the ground potential GND, so that it is necessary to take adequate measures by way of chip layout or the like to prevent generation of a parasitic transistor (Refer to FIG. 4).

Figure 4:
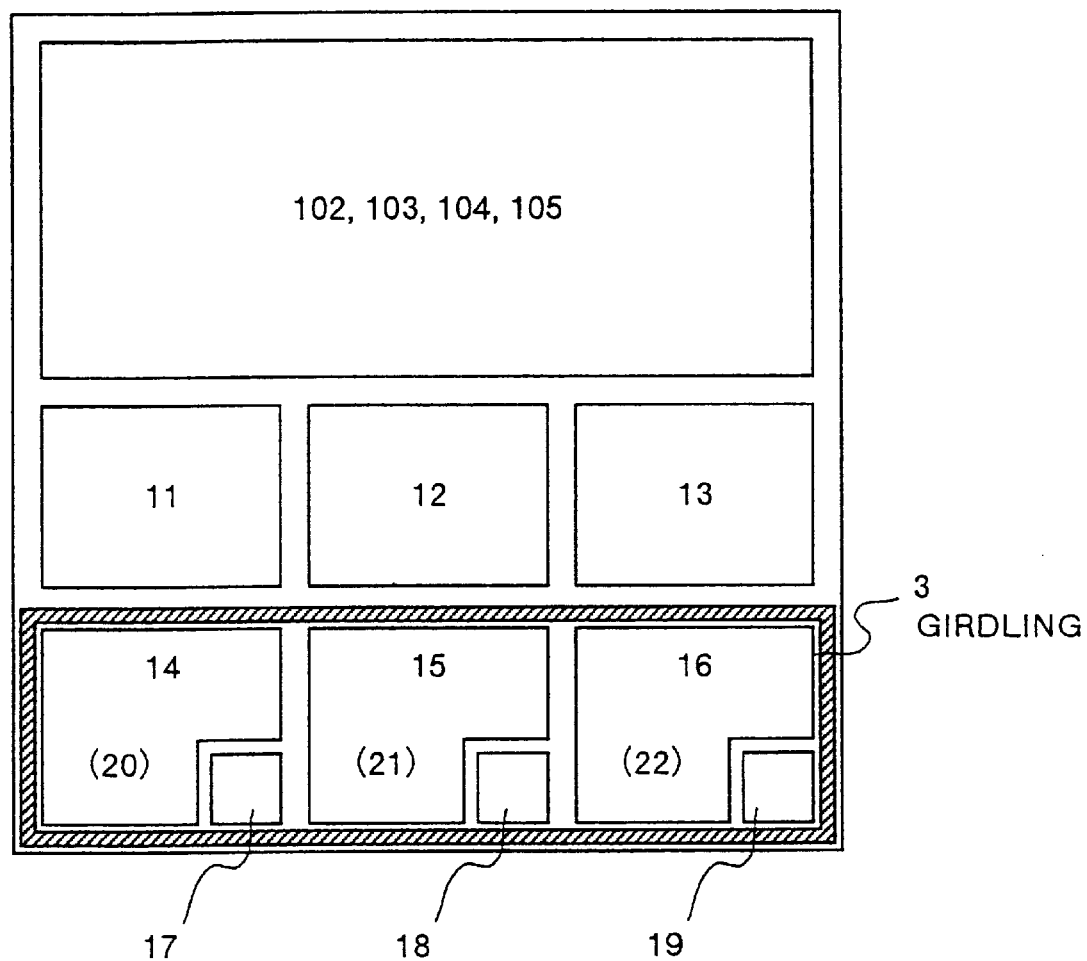
FIG. 4 is a view showing an example of pattern layout in the IC output circuit.

FIG. 4 shows an example of pattern layout of an IC output circuit. In this figure, the regions 102, 103, 104 and 105 represent the places where the triangular wave generating circuit 102, comparator 103, position detecting circuit 104, and output element control circuit 105 are provided. The regions 11, 12, 13, 14, 15 and 16 represent the places where the NPN transistors 11, 12, 13, 14, 15 and 16 are provided. Finally, the regions 17, 18 and 19 represent the places where the first to third diodes 17, 18 and 19 are provided. The regions for the fourth to sixth diodes 20, 21 and 22 are the same as those for the fourth to sixth NPN transistors 14, 15 and 16, so that they are included in parentheses in FIG. 4.

The first to third diodes 17, 18 and 19 are located away from signal systems, such as the triangular wave generating circuit 102, comparator 103, position detecting circuit 104, and output element control circuit 105, to eliminate influence by a parasitic transistor. In the example shown in the figure, regions for the first to third NPN transistors 11, 12 and 13 are located adjacent to the regions 102, 103, 104 and 105, and further regions for the fourth to sixth NPN transistors 14, 15 and 16 are located adjacent to the above regions for the first to third NPN transistors 11, 12 and 13. Regions for the first to third diodes 17, 18 and 19 are located adjacent to the regions for the fourth to sixth NPN transistors 14, 15 and 16.

As a potential at a collector region (the N type region in the NPN transistors constituting each of the fourth to sixth NPN transistors 14, 15, 16 and first to third diodes 17, 18 and 19 is lower than the ground potential GND, the regions for these elements are enclosed with a low potential island comprising N type dopant impurities, namely with a girdling 3 (The effect of such a girdling is disclosed in U.S. Pat. No. 5,753,964).

With this embodiment, when PWM control is OFF, a current path leading from the ground GND via the collector of the fourth NPN transistor 14 (15, 16), the first output terminal OUT1, motor M, second output terminal OUT2, the emitter of the second NPN transistor 12 (111, 13), and the collector of the second NPN transistor 12 (11, 13) to the power terminal VCC is formed. A discharge current flows through this current path from the ground GND to the power terminal VCC, so that a diode dedicated for providing a current path leading from the ground GND to the first output terminal OUT1 of each of the current paths for a discharged current when PWM control is OFF is not required in an IC chip and hence the size of an IC can be reduced.

Also with this embodiment, in each of the current paths for a discharge current when PWM control is OFF, a diode 18 (17, 19) which forms a current path leading from the second output terminal OUT2 to the power terminal VCC is required only to have a capacity enabling current flow sufficient for supplying a base current to the NPN transistor 12 (11, 13), so that its size may be made smaller than the conventional one, which makes it possible to reduce a percentage of an area occupied by the diodes and also to down-size an IC chip.

When the diode 18 (17, 19) is formed by short-circuiting the collector and the base of an NPN transistor to form the anode and using the emitter of the transistor as the cathode, assuming that a current amplification ratio IE/IB of the transistor is 20, the required area may be ¹⁄₂₀ of that of a conventional type of diode (diodes 123, 124 and 125 shown in FIG. 5). Because of this feature, the area occupied by the diodes is reduced, which in turn makes it possible to down-size an IC chip. Also it is not required to use an expensive Schottky diode, so cost for an IC output circuit can be reduced.

With the embodiment, in a layout pattern of an IC chip, regions for the first to third NPN transistors 11, 12 and 13 and regions for the fourth to sixth NPN transistors 14, 15 and 16 are located between the first to third diodes 17, 18 and 19 and a signal system circuit, and further regions for the fourth to sixth NPN transistors 14, 15 and 16 and those for the first to third diodes 17, 18 and 19 are enclosed with the girdling 3 comprising a N type region, so that formation of a parasitic transistor can be prevented.

The present invention can be applied to not only a three-phase brushless motor, but to a two-phase stepping motor. Further, when the position detecting circuit 104 is changed to that based on the sensor-less driving system, the present invention can be applied to a sensor-less driving system not having the Hall elements H1, H2, and H3. Further, the present invention can be applied to a case where a current path is provided to discharge the energy generated in a coil when a three-phase brushless motor is rotated in the reverse direction or a brake is applied to the motor.

As described above, with the present invention, a current path leading from a first terminal to the power terminal is formed when a base current is supplied by a diode to an upper-side NPN transistor and the emitter and the collector of the upper-side NPN transistor are electrically connected to each other, and because of this configuration, of the current paths to be discharged when PWM control is OFF, the diode which forms a current path leading from the first terminal to the power terminal is required only to have a capacity enabling supply of a base current to an upper-side NPN transistor, so that the size of the diode may be smaller than diode that is used conventionally, which makes it possible to reduce the percentage of the area occupied and also to down-size an IC chip.

With another aspect of the present invention, a diode is formed by short-circuiting the collector and the base of an NPN transistor to be used as an anode and also by using the emitter of the transistor as a cathode, so that it is not necessary to use an expensive Schottky diode and it becomes possible to reduce the cost of an IC output circuit.

With another aspect of the present invention, an IC output circuit is laid out in such a way that regions for forming upper-side NPN transistors are located adjacent to the regions for forming the signal system circuits, regions for forming lower-side NPN transistors are located adjacent to the regions for forming the upper-side NPN transistors, and further regions for forming the diodes are located adjacent to the regions for forming the lower-side NPN transistors. Because the diodes are located away from the signal system circuit, it is prevented that a parasitic transistor is generated in the diodes.

This application is based on Japanese patent application No. HEI 11-015879 filed in the Japanese Patent Office on Jan. 25, 1999, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An IC output circuit based on a pulse width modulating system comprising:

an upper-side NPN transistor having a collector connected to a power terminal and an emitter connected to a first terminal;

a lower-side NPN transistor having an emitter connected to ground and a collector connected to a second terminal;

a diode having an anode connected to the emitter of and a cathode connected to a base of said upper-side NPN transistor;

a current path leading from the ground to said second terminal; and a current path leading from said first terminal to the power terminal in which said diode supplies a base current to said upper-side NPN transistor and the emitter and the collector of said upper-side NPN transistor are connected to each other.

2. The IC output circuit based on a pulse width modulating system according to claim 1 wherein said diode comprises an NPN transistor having a collector and a base short-circuited to form an anode and an emitter used as a cathode.

3. The IC output circuit based on a pulse width modulating system according to claim 1 having a layout in which a region including said upper-side NPN transistor is located adjacent a region including a signal system circuit of the IC output circuit, a region including said lower-side NPN transistor located adjacent to a region including said upper-side NPN transistor, and further a region including said diode located adjacent to the region including said lower-side NPN transistor.

* * * * *

UNITED STATES PATENT AND TRADEMARK OFFICE
CERTIFICATE OF CORRECTION

PATENT NO. : 6,101,112
DATED : August 8, 2000
INVENTOR(S) : SUZUKI et al.

It is certified that an error appears in the above-identified patent and that said Letters Patent is hereby corrected as shown below:

Title page,
Item 73: (Assignee), insert the following:

--and Mitsubishi Electric Engineering Co., Ltd.,
 Tokyo, Japan--

Signed and Sealed this

First Day of May, 2001

Attest:

NICHOLAS P. GODICI

*Attesting Officer*  *Acting Director of the United States Patent and Trademark Office*